United States Patent

[11] 3,545,570

| [72] | Inventor | Charles H. Schrader |
| | | R.R.2, Box 202A, Naperville, Illinois 60540 |
| [21] | Appl. No. | 779,472 |
| [22] | Filed | Nov. 27, 1968 |
| [45] | Patented | Dec. 8, 1970 |

[54] SHAFT FLANGE WITH OIL RETURN GROOVES
10 Claims, 5 Drawing Figs.

[52] U.S. Cl..................................................... 184/6,
103/111
[51] Int. Cl..................................................... F16n 7/36
[50] Field of Search........................................ 184/6(N),
6, 6(Y); 103/111, (C)4, (C)5, (C)6, 84

[56] References Cited
UNITED STATES PATENTS

| 2,020,263 | 11/1935 | Marthinsen ................. | 184/6 |
| 2,249,843 | 7/1941 | Marsland..................... | 103/84X |
| 2,487,177 | 11/1949 | Pollock ....................... | 103/111UX |
| 2,957,423 | 10/1960 | Audemar...................... | 103/84 |
| 3,051,497 | 8/1962 | Nigg et al..................... | 103/111UX |
| 3,375,903 | 4/1968 | Swearingen .................. | 184/6 |

FOREIGN PATENTS

| 244,627 | 12/1925 | Great Britain................ | 103/111 |

*Primary Examiner*—Manuel A. Antonakas
*Attorney*—Clarence A. O'Brien & Harvey B. Jacobson ABSTRACT: A circumferentially extending radially outwardly projecting flange on a journalled shaft portion to be rotated in one direction and having first and second wet and damp lubricated end portions, respectively. The flange is disposed between the first and second end portions of the shaft portion and includes circumferentially spaced diagonal peripheral grooves formed therein tending, during rotation of the shaft portion in the one direction, to pump lubricating oil disposed on the damp lubricated end portion side of the flange through the grooves toward the wet lubricated end portion side of the flange.

PATENTED DEC 8 1970

3,545,570

Charles H. Schrader
INVENTOR.

BY *Clarence A. O'Brien*
and *Harvey B. Jackson*
Attorneys

SHAFT FLANGE WITH OIL RETURN GROOVES

A nongrooved flange is usually provided on the rear end of the crankshaft of an it internal combustion engine at the main rear journal of the crankshaft with the flange position between the rear main journal of the crankshaft and the terminal end portion of the crankshaft with which an oil seal is operatively associated. It is customary to provide this flange in an attempt to provide a barrier between the rear main journal of the crankshaft and that portion of the crankshaft with which the rear oil seal is operatively associated.

For the purpose of describing the flange of the instant invention hereinafter the main journal portion of a crankshaft may be considered a "wet lubricated" shaft portion in that oil under pressure is supplied thereto in any conventional manner (not shown) and that portion of the rear terminal end of the crankshaft with which an oil seal is operatively associated may be considered as a "damp lubricated" shaft portion in that a lesser amount of oil is deposited thereon by mere contact with the oil saturated atmosphere within the associated crankcase.

The above referred to "damp lubricated" shaft portions are conventionally provided with helical grooves which coact with the associated oil seal to duct any oil attempting to pass the oil seal back along the crankshaft toward the conventional flange. Of course, as these helical grooves convey oil back along the "damp lubricated" end portion of the shaft the oil is shifted toward the conventional flange and moves outwardly therealong by centrifugal force and is thereafter spun outwardly off the outer peripheral portions of the flange by centrifugal force. However, oil also tends to move radially outwardly along the side of the flange adjacent the "wet lubricated" or rear main journal portion of the shaft and to pass about the outer peripheral portion of the flange toward the "damp lubricated" portion of the shaft. Capillary action as well as centrifugal forces tend to cause the lubricating oil to flow from the "wet lubricated" portion of the shaft toward the "damp lubricated" portion of the shaft. The instant invention is practiced by forming a plurality of circumferentially spaced and radially outwardly opening grooves in the circumferential flange which defines a barrier between the "wet" and "damp" lubricated portions of the shaft and these grooves include end portions which trail in the direction of rotation of the shaft and which are inclined slightly inwardly at their trailing ends whereby, the grooves tend to pick up lubricating oil from the "damp lubricated" side of the flange and pump the oil axially along the shaft toward the "wet lubricated" portion thereof. In addition, the grooves formed in the flange tend to interrupt any tendency of lubricating oil to flow around the flange from the "wet lubricated" side thereof to the "damp lubricated" side thereof.

The main object of this invention is to provide a modified shaft flange structure for more completely reducing the possibility of the flow of lubricating oil from a "wet lubricated" side of the flange to the opposite or a "damp lubricated" side of the flange.

Another object of this invention is to provide an improved lubricating oil barrier flange structure on a rotating shaft including structural features which will tend to convey lubricating oil from a "damp lubricated" portion of the shaft on one side of the flange toward a "wet lubricated" shaft portion disposed on the other side of the flange.

Yet another object of this invention is to provide an improved lubricating oil barrier flange in accordance with the preceding objects and including structural features which will have a tendency to reduce the passage of lubricating oil past the flange from an adjacent "wet lubricated" shaft portion toward a "damp lubricated" shaft portion of the remote side of the flange by capillary action.

A final object of this invention to be specifically enumerated herein is to provide an improved lubricating oil barrier flange in accordance with the preceding objects which will conform to conventional forms of manufacture, by of simple construction and automatic in operation so as to provide a device that will be economically feasible, long lasting and trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
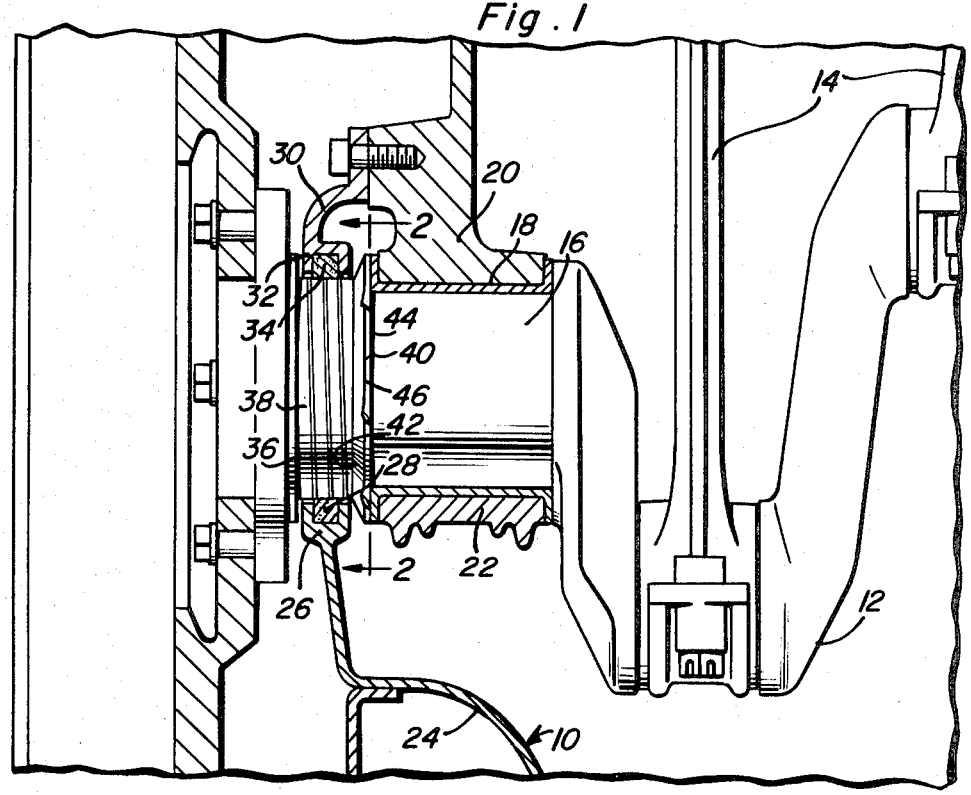
FIG. 1 is an elevational view of the rear end of a crankshaft provided with an oil barrier flange constructed in accordance with the present invention and disposed between a "damp lubricated" portion of the crankshaft provided with a helical groove and with which an oil seal is operatively associated and a "wet lubricated" portion of the shaft defining its rear main journal portion.
Figure 2:
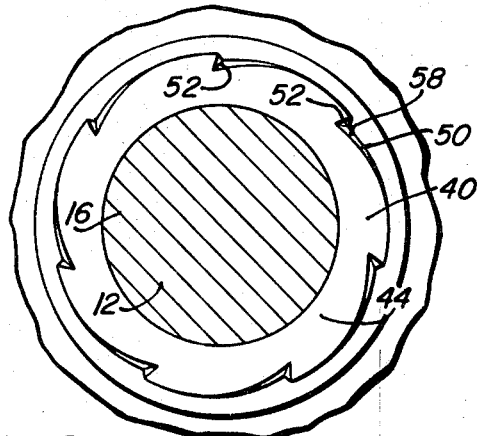
FIG. 2 is an enlarged vertical sectional view taken substantially upon the plane indicated by the section line 2-2 of FIG. 1.
Figure 4:
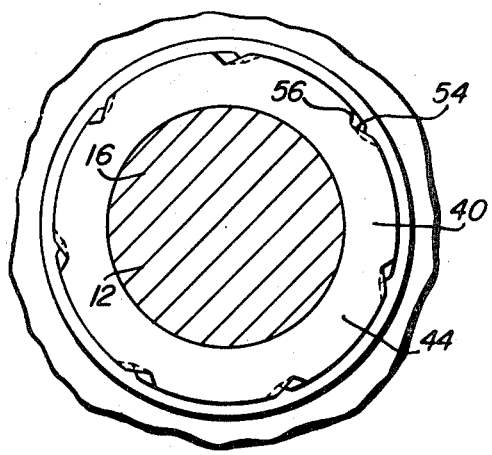
FIG. 4 is a view similar to FIG. 2 but illustrating a slightly modified form of flange constructed in accordance with the present invention.

Referring now more specifically to the drawings, the numeral 10 generally designates a conventional form of reciprocating piston engine including a crankshaft 12 to which a plurality of connecting rods 14 are secured. The crankshaft 12 includes a rear main journal 16 which is rotatably supported by an insert bearing 18 carried by a rear bearing support 20 of the engine 10 having a rear me main bearing cap 22 removably secured thereto.

The engine 10 also includes a lower crank pan 24 including an upwardly arcuate and grooved rear portion 26 in which the lower half 28 of an oil seal is seated. In addition, the engine 10 includes an upper co er plate 30 removably secured thereto and including a downwardly opening, semicylindrical and grooved portion 32 in which the upper half 34 of the rear oil seal is disposed. The upper and lower halves 34 and 28 coact with each other to form an oil seal about the rearward extension 36 of the rear journal 16, which extension is provided with a helical groove 38 which may be considered as right handed as viewed from the left-hand side of FIG. 1. In addition, the crankshaft 12 includes a radially outwardly projecting flange 40 intermediate rear journal 16 and the extension 36 and the flange 40 includes a slightly beveled rear face 42 as opposed to its substantially radial front face 44. In addition, the beveled rear face 42 is not beveled completely to the front face 44 and thus the flange 40 includes a peripheral edge face 46 which is substantially cylindrical in configuration but very short in axial extent.

The preceding description of the engine 10, crankshaft 12 and attendant bearing and seal elements as well as the groove 38 and the flange 40 may be considered as conventional.

The instant invention resides in the provision of a plurality of circumferentially spaced inclined notches or grooves 50 formed in the outer peripheral portion of the flange 40 which serve as oil return grooves tending to receive oil from the upper and lower halves 34 and 28 of the oil seal and the grooved extension 36 of the rear journal 16.

Figure 3:
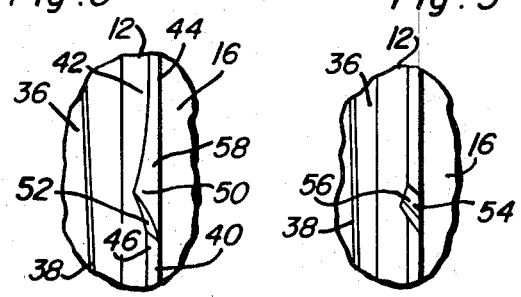
FIG. 3 is a fragmentary enlarged elevational view of one peripheral portion of the flange.

It must first be explained that the crankshaft 12 rotates in a counterclockwise direction as viewed from the left side of FIG. 1 and from FIG. 3 of the drawings it may be seen that the grooves 50 are inclined inwardly toward the rear journal 16 approximately 30°. Further, the sidewall face 52 of each groove 50 defining the deeper side of the groove is inclined approximately 30° relative to the plane in which the flange 40 is disposed. Consequently, the deep side of the groove trails in the direction of rotation of the crankshaft 12 and the side face 52 of each groove 50 is inclined inwardly in a trailing direction relative to the direction of rotation of the crankshaft 12.

The grooves 50 tend to interrupt the flow of lubricating oil from the rear journal 16 around the flange 40 and toward the rear extension 36 by capillary action and the grooves 52 operate, during rotation of the crankshaft 12, to pick up oil from the rear side of the flange 40 and discharge this oil forwardly toward the rear journal 16.

Figure 5:
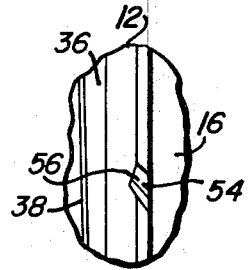
FIG. 5 is an enlarged fragmentary elevational view similar to FIG. 3 but illustrating one peripheral portion of the modified flange structure of FIG. 4.

With attention now invited more specifically to FIG. 5 of the drawings there will be seen a modified form of groove referred to by the reference numeral 54 and which is the substantial equivalent for each of the grooves 50 except that the bottom wall 56 of each groove 54 is generally planar whereas the bottom wall 58 of each groove 50 is arcuate with its center of curvature disposed within the circumference of the rear journal 16. This of course results in the grooves 54 being of shorter circumferential extent than the grooves 50. Otherwise, the operation of the grooves 54 is substantially the same as the groove 50.

The foregoing is considered as illustrative only of the pro principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination, a shaft rotated in one direction and including axially spaced wet and damp lubricated portions, a circumferentially extending generally radially outwardly projecting flange disposed on said shaft intermediate said portions and defining a barrier to the free flow of oil along said shaft from said wet lubricated portion to said damp lubricated portion, said flange including a plurality of circumferentially spaced grooves formed through its outer peripheral portion inclined relative to the center axis of said shaft with the ends of said grooves adjacent said wet lubricated portion trailing relative to said one direction of rotation of said shaft.

2. The combination of claim 1 wherein the side of said flange adjacent said damp lubricated portion is inclined outwardly toward said wet lubricated portion.

3. The combination of claim 1 wherein the bottom wall of said grooves are longitudinally inclined inwardly toward the center axis of said shaft at their ends adjacent said wet lubricated portion.

4. The combination of claim 3 wherein the last-mentioned inclination of said grooves comprises an inclination of generally 30° relative to the center axis of said shaft.

5. The combination of claim 1 wherein the bottom surfaces of said grooves extend generally along chords of the outer periphery of said flange and the sides of said bottom surfaces leading in said one direction of rotation of said shaft open through the outer peripheral edge of said flange.

6. The combination of claim 5 wherein said bottom surfaces are generally planar.

7. The combination of claim 1 wherein the bottom surfaces of said grooves extend generally along chords of the outer periphery of said flange and the sides of said bottom surfaces leading in said one direction of rotation of said shaft open through the outer peripheral edge of said flange, said bottom surfaces of said grooves being generally partially cylindrical with the radii of curvatures thereof less than the radius of said flange and all radii of each of said bottom surfaces terminating inwardly of a cylindrical area containing the circumference of said wet lubricated portion and disposed on the side of a plane containing said flange remote from said wet lubricated portion.

8. The combination of claim 1 wherein the side of said flange adjacent said wet lubricated portion is disposed at generally right angles relative to the longitudinal center axis of said shaft.

9. The combination of claim 8 wherein the side of said flange adjacent said damp lubricated portion is inclined outwardly toward said wet lubricated portion.

10. The combination of claim 9 wherein the bottom surfaces of said grooves extend generally along chords of outer periphery of said flange and the sides of said bottom surfaces leading in said one direction of rotation of said shaft open through the outer peripheral edge of said flange.